Oct. 9, 1945.   F. H. ANDRUS   2,386,179
POSITIONING INDICATOR FOR ENGINE PISTONS
Filed March 10, 1943
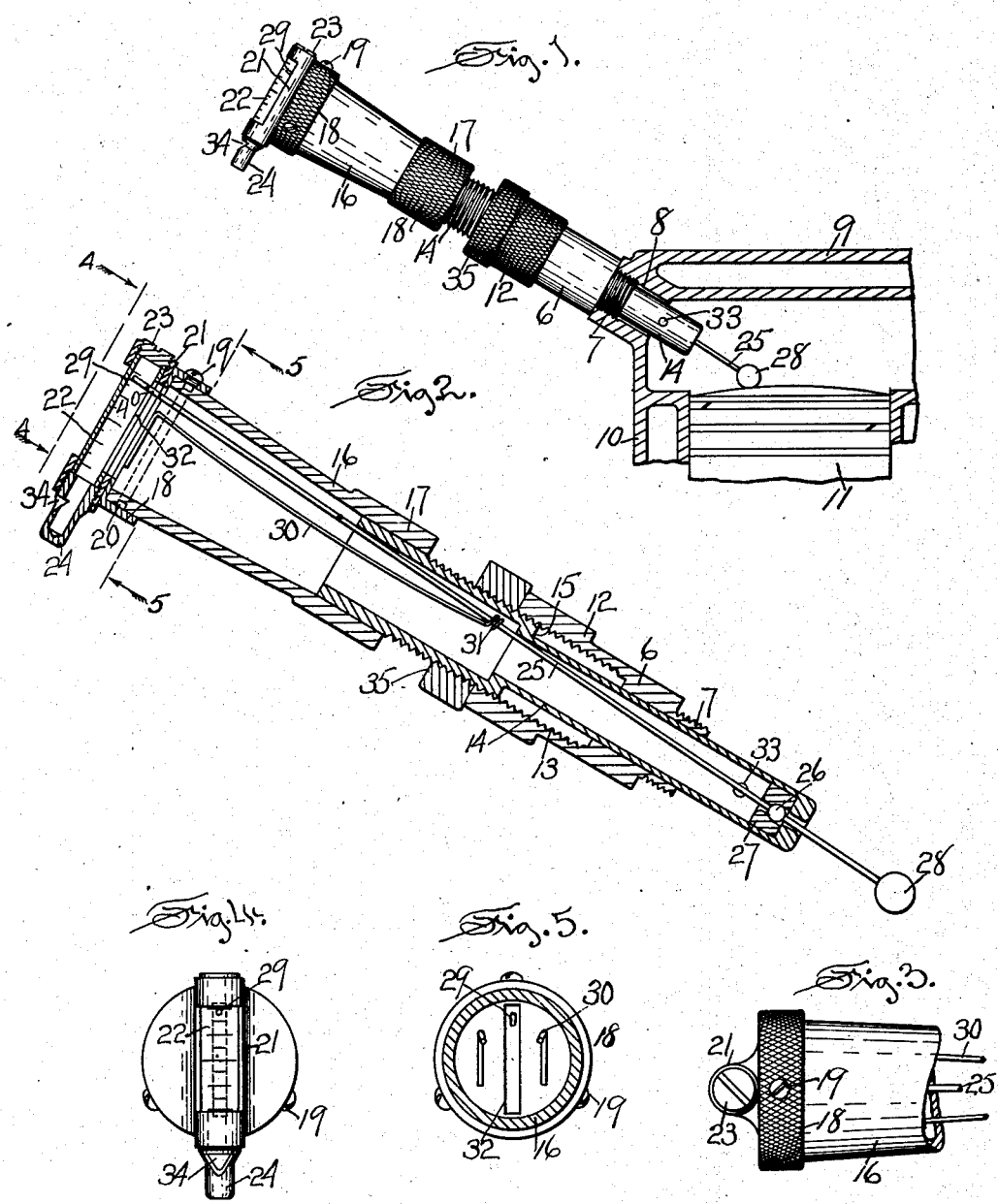
INVENTOR
Roscoe H. Andrus
by Arthur B. Jenkins
ATTORNEY Patented Oct. 9, 1945

2,386,179

UNITED STATES PATENT OFFICE 2,386,179

POSITIONING INDICATOR FOR ENGINE PISTONS

Foscoe H. Andrus, Windsor, Conn.

Application March 10, 1943, Serial No. 478,691

3 Claims. (Cl. 33—172)

My invention relates to an indicator for determining the positions of the pistons in engine cylinders and particularly to denote when a piston has reached the end of its compression stroke, especially for the purpose of determining spark plug timing relative to compression by the piston, and an object of my invention, among others, is to produce an indicator for this purpose that shall be simple in construction and particularly efficient in the results obtained by its use.

One form of an indicator embodying my invention and in the construction and use of which the objects herein set out, as well as others, may be attained is illustrated in the accompanying drawing, in which—

Figure 1 is a view in section through the upper portion of the cylinder of an engine illustrating the manner of application thereto and the manner of use of my improved indicator to denote the position of the cylinder at the end of its compression stroke.

Figure 2 is a view in central lengthwise section through the indicator.

Figure 3 is a view of one end of the indicator broken off from the main part to illustrate the relative arrangement of the indicator rod and its supporting spring.

Figure 4 is a view looking at the indicating end of the instrument as denoted by the broken line 4—4 of Fig. 2.

Figure 5 is a view in section on a plane denoted by the broken line 5—5 of Fig. 2.

In the accompanying drawing the numeral 6 denotes a supporting plug that is in the form of a tubular part, this plug having a threaded end 7 for attachment of the instrument within the spark plug opening 8 in the cylinder head 9 of a cylinder 10 containing a piston 11 in connection with which the indicator is to be used. The plug 6 has a head 12 that may be knurled as a convenient means for inserting the plug within the spark plug opening 8. A counterbored threaded opening 13 is formed in the plug 6, as shown in Fig. 2, to receive the threaded portion of a tubular body 14 provided with a shoulder 15 to form a stop by engagement with the bottom of the counterbored opening 13. The body extends through the plug 6, projecting out of said plug at its inner end.

The tubular body also includes an adjusting head 16 that is tubular and receives the end of the tubular body 14 the two parts being rigidly secured together in any suitable manner. The end of the head 16 may be knurled as at 17 if desired to facilitate turning movement of the entire body for adjusting purposes as will be hereinafter explained. An indicator case is rotatably adjustably secured to the outer end of the adjusting head 16, this case comprising a flange 18 rotatably attached to the head 16 as by means of screws 19 with their ends entered into an annular groove 20 in the head 16. A barrel 21 comprises a part of the indicator case said barrel extending diametrically across the center of the case at the end thereof. This barrel contains a sight glass 22 bearing graduations for a purpose to be presently disclosed. The barrel is closed at one end by a screw plug 23 and at its opposite end by a nipple 24.

An indicator rod 25 extends through the tubular body, said rod being secured in and extending through a ball bearing 26 in a ball case 27 in the outer tip end of the supporting body, as shown in Fig. 2. The rod 25 projects out of the body at this end and has a contact 28 in the form of a ball secured at its end. The opposite end of the indicator rod constitutes an indicating finger 29 that operates in connection with the graduations in the sight glass 22.

A spring 30 is secured at one end to the inner surface of the indicator case inside of the flange 18, the opposite end of this spring having a ring 31 through which the indicator rod 25 extends, the spring acting to bias the indicator rod to locate the finger piece 29 at the zero end of the scale.

It will be noted that the rod extends in a diagonal direction through the tubular support in such manner that in its working position it is located at one side of an axial line through the support, this being the position required for obtaining the results for which the instrument is designed. The finger 29 extends through a slot 32 formed through the bottom of the indicator case including the sight glass and by turning the case on the adjusting head 16 the contact 28 will be moved in an eccentric path and the nipple 24 is employed to determine the proper position of the contact for indicating purposes, as the nipple and the contact will always be located in the same relative positions on one side of an axial line through the supporting body.

An air hole 33 is formed through the inner end of the tubular body, adjacent the ball bearing for the indicator rod 25. This admits air into the tubular body, and as the piston 11 moves toward the end of the cylinder in its compression stroke air is forced through the tubular support and out of a whistle opening 34 in the nipple 24.

In the use of the device the tubular support comprising the parts 14 and 16 being at or near the outer limit of their play in the supporting plug 6, the latter having been secured in the spark plug opening 8 and the contact 28 and nipple 24 having positions as hereinbefore explained, the engine is operated by hand thereby moving the piston 11 toward the end of the cylinder in its compression stroke. This movement of the piston will force air from the chamber in the cylinder into the hole 33 through the tubular support and out of the whistle opening 34 thereby creating a whistle noise. As soon as the piston nears the end of its compression stroke, the compression having been reduced the whistle noise will cease, this denoting that the piston is near the limit of its compression stroke but not having quite reached it. The tubular support is now turned to screw it inwardly within the supporting plug 6 by use of the knurled end 17 and this turning movement of the support is continued until the indicator finger 29 denotes a slight movement, this indicating that the piston has touched the contact 28. The engine is now again turned by hand, the movement of the indicating finger is noted, and as soon as such movement ceases it is known that the piston has reached the limit of its compression stroke.

In adjusting the position of the tubular support as above described turning movement of such support should cease with the nipple 24 and the contact 28 in line on the same side of the instrument as hereinbefore described, the nipple being located to point to the axis of the crank shaft of the engine, it being assured that with the nipple pointed in this direction the contact will be in the position shown in Fig. 1 pointing diagonally downward to contact with the surface of the end of the piston.

A lock nut 35 is screw threadedly engaged with the tubular body 14 for the purpose of securing the tubular body in any position to which it may have been adjusted relatively to the supporting plug 6. This feature is of importance as all of the cylinders in any one engine and in fact all of the cylinders in any one make of engine are of substantially the same construction so that all of the pistons will reach the same point at the end of their compression strokes. Therefore the instrument having been adjusted for use on any one cylinder, this adjustment will be proper for all of the cylinders of any one engine or of any one make of engine.

It will be noted that the spring 30 is of hairpin shape, the ring 31 being located at the bend of the spring and the branches each terminating in bent ends secured to the inner surface of the indicator case 18 as shown in Figs. 2 and 3 of the drawing, and that the rod 25 is formed square to conform to the shape of the slot 32, as shown in Fig. 2.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. A piston positioning indicator comprising a supporting plug adapted for attachment within the spark plug opening in a cylinder, a tubular body mounted in said supporting plug, a thread connection between said tubular body and plug for adjustably placing said tubular body in different fixed positions in said plug relatively thereto lengthwise of said body, a lock nut threaded on the tubular body and engaged with the plug for securing said tubular body in different adjustable positions, an indicating rod extending within said tubular body from the outer to the inner end thereof with its inner end projecting for contact with the end of a piston within said cylinder, a pivotal bearing for said rod within said tubular body, and means at the outer end of the instrument for denoting movement of the indicator rod.

2. A piston positioning indicator comprising a supporting plug adapted for attachment within the spark plug opening in a cylinder and having an unobstructed bore extending completely therethrough, a tubular body mounted in said supporting plug and extending completely through the bore therein to position its inner end within the compression chamber in said cylinder, means for adjustably placing said tubular body in different positions in said plug relatively thereto lengthwise of said body, an indicating rod extending within said tubular body from the outer to the inner end thereof with its inner end projecting for contact with the end of said piston beyond said body, a pivotal bearing for said rod within said tubular body in proximity of the inner end thereof and within the cylinder for amplifying movement of the outer end of the rod, and means at the outer end of the instrument for denoting movement of said indicating rod.

3. A piston positioning indicator comprising a supporting plug adapted for attachment within the spark plug opening in a cylinder, a tubular body mounted in said supporting plug, means for adjustably placing said tubular body in different positions in said plug relatively thereto lengthwise of said body, an indicating rod extending diagonally within said tubular body from one side toward the opposite side thereof and pivotally and rotatably mounted therein with opposite ends of said rod located laterally thereof on opposite sides of said pivot, a contact member on one end of said rod and an indicating finger on the other end of said rod, a cap having a cross slot in its outer end rotatably mounted on one end of said tubular body and within which said indicating rod extends with the finger projecting through the cross slot whereby rotation of said cap will produce a relative change in position of said finger eccentrically to the axis of said tubular body, and means upon said cap for denoting the amount of movement of said indicating finger.

FOSCOE H. ANDRUS.